United States Patent [19]
Goto et al.

[11] Patent Number: 5,812,880
[45] Date of Patent: Sep. 22, 1998

[54] MULTI-CPU SYSTEM'S DATA I/O PROCESSOR WITH COMMUNICATION ARBITRATOR PERFORMING ACCESS OPERATIONS ON I/O CONNECTED TO A FIRST CPU BUS ON BEHALF OF A SECOND CPU

[75] Inventors: Yoshinori Goto, Kariya; Koji Onishi, Anjou, both of Japan

[73] Assignee: Nippondenso Co., Ltd., Kariya, Japan

[21] Appl. No.: 613,252

[22] Filed: Mar. 8, 1996

[30] Foreign Application Priority Data

Mar. 10, 1995 [JP] Japan .................................. 7-051553

[51] Int. Cl.⁶ .......................... G06F 13/20; G06F 13/36; G06F 15/16
[52] U.S. Cl. ...................... 395/857; 395/889; 395/834; 395/835; 395/311
[58] Field of Search ..................... 395/311, 293, 395/822, 200.38, 200.47, 800.31, 800.34, 856, 858, 860, 871, 857, 835, 889; 364/131, 132, 137, 424.038

[56] References Cited

U.S. PATENT DOCUMENTS 4,363,094 12/1982 Kaul et al. .............................. 395/293
4,514,823 4/1985 Mendelson et al. ..................... 395/822
4,882,702 11/1989 Struger et al. .......................... 395/822
5,089,953 2/1992 Ludicky .................................. 395/293

FOREIGN PATENT DOCUMENTS 4-027634 3/1992 Japan .
4-224256 8/1992 Japan .
5-033718 2/1993 Japan .
7-098695 4/1995 Japan .

*Primary Examiner*—Thomas C. Lee
*Assistant Examiner*—D. Dinh
*Attorney, Agent, or Firm*—Cushman Darby & Cushman IP Group of Pillsbury Madison & Sutro LLP

[57] ABSTRACT

A first CPU and a second CPU form a multi-CPU system which distributes processes related to data input-output and computation. Input-output devices such as an A/D converter and the like are connected to the first CPU through a bus. First and second serial communication circuits stand between the second CPU and the input-output devices of the A/D converter and the like to transmit and receive access demands from the second CPU to the input-output devices of the A/D converter and the like, and the demanded data. Also, the communication arbitration circuit stands between the first serial communication circuit and the first CPU to arbitrate access operations of the first CPU and of the second CPU to the input-output devices of the A/D controller and the like so that these access operations do not overlap.

10 Claims, 7 Drawing Sheets

FIG. 3

(INCOMING MSG. FORMAT)

| b15 | b14 | b13 | b12 | b11 | b10 | b09 | b08 | b07 | b06 | b05 | b04 | b03 | b02 | b01 | b00 |
|---|---|---|---|---|---|---|---|---|---|---|---|---|---|---|---|
| COMMAND ||| ADDRESS, A/D CH. ||||| DATA ||||||||
| 000:STP (COMM. END) ||| --------- ||||| --------------- ||||||||
| 001:ACCESS (RAM INP. BUF.) ||| ACCESS ADDR. ||||| --------------- ||||||||
| 010:STORAGE (RAM OUTPUT BUF.) ||| STORAGE ADDR. ||||| STORAGE DATA (8 BITS) ||||||||
| 011: A/D CONV. ||| A/D CONVERSION ||||| --------------- ||||||||

FIG. 4

(OUTGOING DATA FORMAT)

| b15 | b14 | b13 | b12 | b11 | b10 | b09 | b08 | b07 | b06 | b05 | b04 | b03 | b02 | b01 | b00 |
|---|---|---|---|---|---|---|---|---|---|---|---|---|---|---|---|
| ACCESS RESULT DATA (A/D CONV., RAM, INPUT BUF.) |||||||||| IDENT. BIT | ADDR., A/D CH. (INC. MSG. COPY) |||||

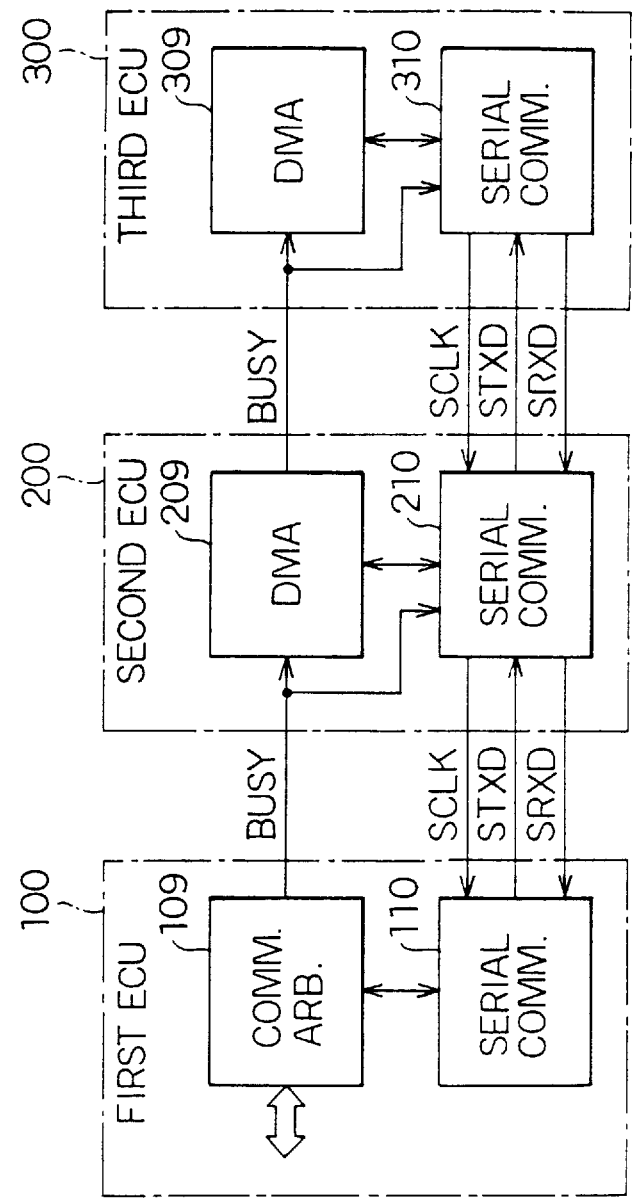

MULTI-CPU SYSTEM'S DATA I/O PROCESSOR WITH COMMUNICATION ARBITRATOR PERFORMING ACCESS OPERATIONS ON I/O CONNECTED TO A FIRST CPU BUS ON BEHALF OF A SECOND CPU

CROSS-REFERENCE TO RELATED APPLICATION

This application is related to and claims priority from Japanese Patent Application No. Hei-7-51553, the contents of which are hereby incorporated by reference.

BACKGROUND OF THE INVENTION

1. Field of the Invention

The present invention relates to a data input-output processor of a multi-CPU system for processing data input and output between a plurality of CPUs used for engine control and the like. More specifically, the present invention relates to the realization of a processor construction which is suitable for the sharing of A/D (analog-digital) converters, input-output buffers and the like among a plurality of electronic controllers.

2. Description of Related Art

With stricter legal controls (e.g., exhaust gas regulations and the like), reduced fuel consumption, more complicated diagnosis operations and the like affecting modern engine control, there is an ongoing shift from unifying all controls and operations under one electronic controller to distributing such controls and operations among a plurality of electronic controllers. In other words, there is an ongoing shift to dividing functions among a plurality of electronic controllers.

In connection with this, when performing engine control by distributing functions among a plurality of electronic controllers, coolant temperature information, air flow volume information, engine rotational speed information and the like, which are detected by sensors distributed in various engine parts, will be used by each electronic controller, and the computation of the fuel injection amount and ignition timing based on such information, as well as the driving control and the like of the corresponding actuators will be executed individually by each electronic controller.

However, if the necessary information is provided individually to each electronic controller of such a plurality of controllers, the number of input ports will increase, thus making the input circuits more complicated. Also, while one electronic controller can be made to incorporate the necessary information on behalf of the other electronic controllers and have the same transmit information to the other electronic controllers through a proper communication method, delays due to such transmission will occur for this construction, and thus control efficiency declines for this system which can be called a multi-CPU system.

Accordingly, in conventional art, as can be seen, for example, in the device described in Japanese Patent Application No. Hei-5-33718, with regards to the A/D conversion process of analog input signals (sensor signals), devices which employ the following configurations have been proposed so far:

the analog signal in question is classified as a low-speed processing signal or a high-speed processing signal;

with regards to the low-speed processing signal, the A/D converter inside the electronic controller that is a master device acts to incorporate it and, when needed, sends the A/D converted signal via a communication unit to the electronic controller that acts as a slave device; and with regards to the high-speed processing signal, this signal is incorporated individually by the A/D converters of the electronic controller that acts as the master device and the electronic controller that acts as the slave device.

In this way, by classifying analog signals into low-speed processing signals and high-speed processing signals, and by choosing A/D converters in accordance with the processing speed of the signals, the input circuit can be simplified while retaining control functions as the multi-CPU system.

However, for conventional devices, at least with regards to the high-speed processing signal, there is a need for separate A/D converters for the master and slave electronic controllers. In other words, in view of the present technological demands for cutting down on device components and reducing of circuit size, this conventional device still leaves some problems unanswered.

Still, in conventional technology, as shown in Japanese Utility Model Application Laid-Open No. Hei-4-27634, there are also some devices which try to cut down on device components and reduce the circuit size by sharing one A/D converter among a plurality of CPUs through time-sharing.

However, in this time sharing procedure, the A/D converter can be used only for a predetermined period of time or for a certain configuration and its application to a system such as, for example, the electronic controller used in engine control in which A/D conversions are demanded asynchronously every time an event occurs is difficult.

Meanwhile, while the case in which the A/D converter is shared by a plurality of electronic controllers (CPU) has been discussed for the sake of convenience, input buffer circuits, output buffer circuits and the like can also be such input-output devices that can be shared.

Also, this situation is not only limited to the case of the engine control electronic controller but, in general, also applies to a multi-CPU system in which a plurality of electronic controllers (CPU) try to asynchronously share the input-output device.

SUMMARY OF THE INVENTION

In view of the foregoing problems of the prior art in mind, it is a goal of the present invention to provide a data input-output processor of a multi-CPU system in which an input-output device is shared efficiently in accordance with the situation without losing any control capacity as a multi-CPU system.

To achieve this goal, one aspect of the present invention provides a data input-output processor of a multi-CPU system which executes data input-output and computation-related processes by distributing functions among a plurality of CPUs, where the data input-output processor includes a data input-output unit connected by a bus to a first CPU for executing data input-output, a communication unit which stands between a second CPU that is distinct from the first CPU and the data input-output unit to transmit and receive access data of the second CPU to the data input-output unit; and a communication arbitration unit which stands between the communication unit and the first CPU to arbitrate access operations of the first CPU and the second CPU to the data input-output unit so that these access operations do not overlap.

If analog signals are divided into low-speed processing signals and high-speed processing signals, the input circuit is simplified, and the control functions as a multi-CPU system are also maintained with a construction where an appropriate A/D converter is chosen in accordance with the processing speed of these signals. However, with the same construction, a separate A/D converter must be provided for at least the high-speed processing signals and thus, as was stated before, this construction does not lessen the number of mounted components nor does it reduce the circuit size.

Also, even if the number of mounted components and the circuit size are reduced with a construction wherein a plurality of CPUs, for example, share one A/D converter through time sharing, its application to a system where A/D conversion demands are generated asynchronously, i.e., every time an event occurs, is difficult.

In this way, with the first aspect of the invention, the first CPU and the second CPU can directly access the data input-output unit at basically an arbitrary timing via the bus and the communication unit, respectively.

Moreover, because conflicts between the accesses of the first CPU and the second CPU are appropriately avoided due to the presence of the communication arbitration unit, there will be no need to worry about malfunctions in the data input-output unit and destruction of the input-output data.

In this way, through the communication arbitration unit, the other CPUs can be made to wait while a particular CPU is performing access operations and the data input-output unit can be shared effectively among a plurality of CPUs. In other words, with such sharing, irrespective of whether the signal is a slow-speed processing signal or a high-speed processing one, the second CPU can directly access the data input-output unit without going through the first CPU. Also, there is no increase in the processing load of the first CPU when the second CPU is using the data input-output unit. Furthermore, lessening of the mounted components and reduction of the board size can be designed appropriately together with simplifying the application of this construction to a system where access demands to the data input-output unit are generated asynchronously.

Another aspect of the present invention provides a data input-output processor of a multi-CPU system in which when the first CPU is not accessing the data input-output unit, the communication arbitration unit executes access operations to the data input-output unit on behalf of the second CPU in accordance with the demand received by the communication unit from the second CPU.

In this way, if the data input-output unit is an output buffer or the data memory unit of the first CPU, data storage operations of the second CPU to such a buffer or memory unit can be executed swiftly and with certainty through such communication arbitration unit.

An additional aspect of the present invention provides a data input-output processor of a multi-CPU system wherein when the first CPU is not accessing the data input-output unit, the communication arbitration unit executes access operations to the data input-output unit on behalf of the second CPU in accordance with the demand received by the communication unit from the second CPU and sends access results to the second CPU via the communication unit.

In this way, for example, if the data input-output unit is an A/D converter, an input buffer or the data memory unit of the first CPU, access operations of the second CPU to these components as well as the retrieval of data from these components can be executed swiftly and with certainty through such a communication arbitration unit.

A further aspect of the present invention provides a data input-output processor of a multi-CPU system where the communication arbitration unit includes a bus switching unit for selectively connecting a bus, which is connected to the data input-output unit, to the first CPU and to the communication arbitration unit.

In this way, the first CPU and the communication arbitration unit can share the bus. In other words, this reduces not only the mounting space of the but also reduces the circuit size.

A yet additional aspect of the present invention provides a data input-output processor of a multi-CPU system where the communication unit transmits and receives the data via serial data-based handshake communication.

In this way, high-speed communication between the second CPU and the data input-output unit is achieved with fewer communication lines. This also helps further reduce the board size.

Meanwhile, if a high-precision digital signal is to be obtained from an analog input signal, the resolution of the A/D converter itself must be enhanced. In other words, the A/D converter becomes a very expensive component. In this way, the construction where the A/D converter is shared among a plurality of CPUs becomes one of great significance.

Thus, one other aspect of the present invention provides a data input-output processor of a multi-CPU system which executes data input-output and computation-related processes by distributing functions among a plurality of CPUs, where the data input-output processor includes an A/D conversion unit connected by a bus to a first CPU for converting an analog input signal to a digital signal, a communication unit which stands between a second CPU that is distinct from the first CPU and the A/D conversion unit to transmit and receive an A/D conversion demand from the second CPU and converted data from the A/D conversion unit, and a communication arbitration unit which stands between the communication unit and the first CPU to arbitrate A/D conversion demands of the first CPU and the second CPU to the A/D conversion unit so that these demands do not overlap.

In this way, the access operations of the other CPUs can be made to wait while a particular CPU is performing access operations and the expensive A/D converter can be shared among a plurality of CPUs. As was stated before, with this sharing, irrespective of whether the signal is a low-speed processing signal or a high-speed processing signal, the second CPU can directly access the data input-output unit without going through the first CPU and there will be no increase in the processing load of the first CPU when the second CPU is using the data input-output unit. Also, in this case, the above-described lessening of the mounted components and reduction of the board size can be designed appropriately together with simplifying the application of this construction to a system where access demands to the data input-output unit are generated asynchronously such as an engine controller and the like.

A yet further aspect of the present invention provides a data input-output processor of a multi-CPU system where when the first CPU is not accessing the A/D conversion unit, the communication arbitration unit executes access operations to the A/D conversion unit on behalf of the second CPU in accordance with the A/D conversion demand received by the communication unit from the second CPU, and sends converted data to the second CPU via the communication unit.

In this way, for example, an A/D conversion demand from the second CPU in which an arbitrary channel is chosen and the retrieval of data based on such a demand can be performed swiftly and with certainty through the communication arbitration unit.

Another aspect of the present invention provides a data input-output processor of a multi-CPU system where the communication arbitration unit includes a bus switching unit for selectively connecting a bus, which is connected to the A/D conversion unit, to the first CPU and to the communication arbitration unit.

In this way, the first CPU and the communication arbitration unit can share the bus. In other words, the space for the bus provision can be reduced which, in turn, leads to the reduction of the circuit size.

An additional aspect of the present invention is the data input-output processor of a multi-CPU system where the communication unit transmits and receives the A/D conversion demand and the converted data via serial data-based handshake communication.

In this way, high-speed data communication between the second CPU and the A/D conversion unit can be realized with fewer lines (communication lines). Also, this promotes the further reductions in the circuit size.

BRIEF DESCRIPTION OF THE DRAWINGS

Additional objects and advantages of the present invention will be more readily apparent from the following detailed description of preferred embodiments thereof when taken together with the accompanying drawings in which:

FIG. 3 is a schematic diagram of a format of incoming messages used in the data input-output processor;

FIG. 4 is a schematic diagram of a format of outgoing messages used in the data input-output processor;

FIG. 8 is a block diagram of a further example of a system expansion of the data input-output processor.

DETAILED DESCRIPTION OF PRESENTLY PREFERRED EXEMPLARY EMBODIMENTS

Preferred embodiments of the present invention are described hereinafter with reference to the accompanying drawings.

Figure 1:
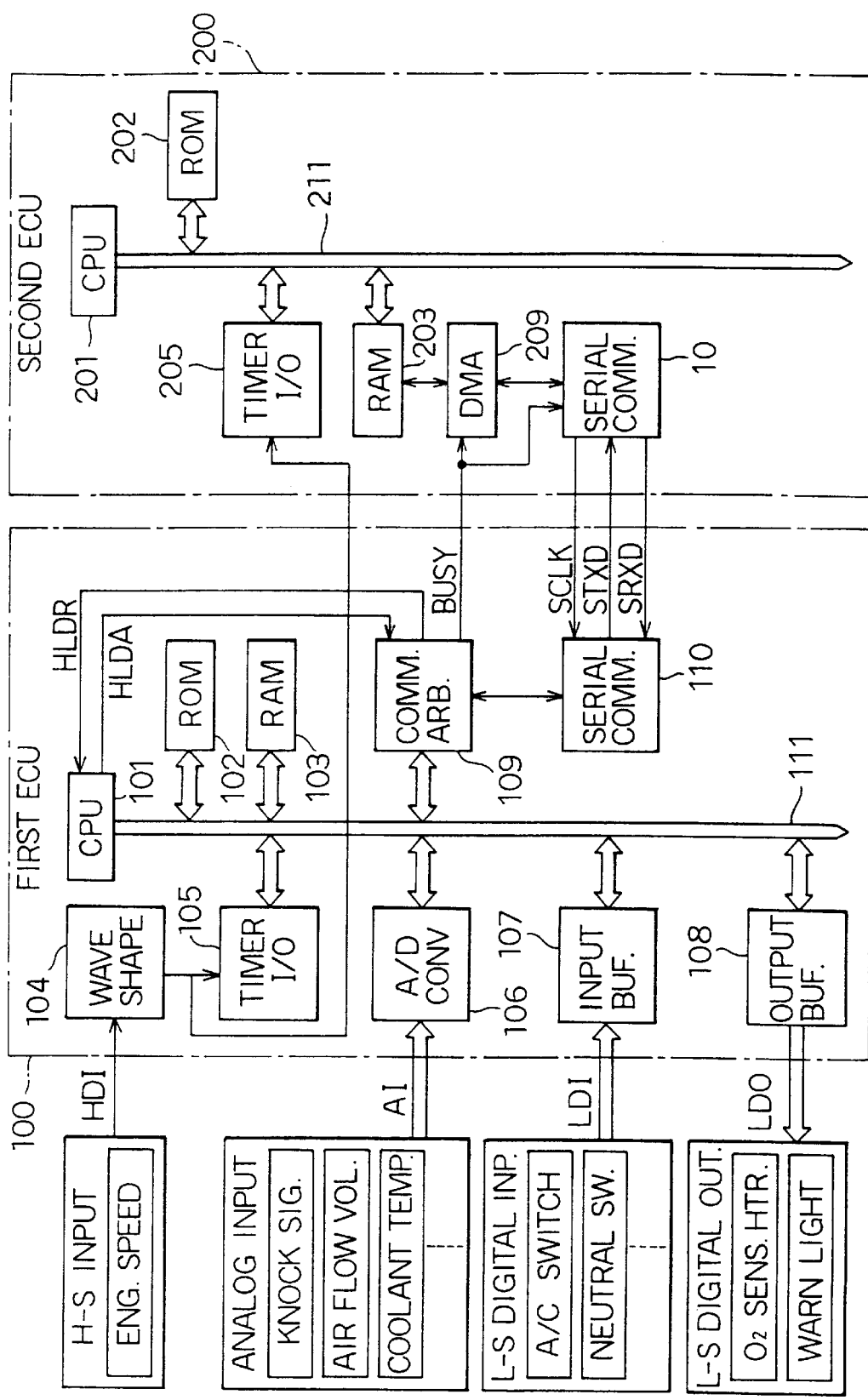
FIG. 1 is a block diagram of a data input-output processor according to a first embodiment of the present invention.

FIG. 1 shows one embodiment of a data input-output processor of a multi-CPU system according to the present invention.

Taking an electronic controller of a vehicle-mounted engine as an example of the above-described multi-CPU system, the data input-output controller of the present embodiment as one part of such electronic controller is constructed to be a device which executes, for example, an anti-knock control process of the engine and computations related to the same process by distributing functions between CPUs mounted individually in a first electronic controller and a second electronic controller.

First, the construction of the device of the present embodiment is explained with reference to FIG. 1.

As shown in FIG. 1, in the device of the present embodiment, various input signals such as high-speed digital inputs, various analog inputs, low-speed digital inputs and the like are all provided to the first electronic controller 100.

Incidentally, engine speed and the like are examples of high-speed digital inputs; knock signal, air flow volume, coolant temperature and the like are examples of analog inputs; and the condition of an air conditioner (A/C) switch, the condition of a neutral switch and the like are examples of low-speed digital inputs. It must be noted here that with regards to the processing speed of these signals, signals having durations on the order of several msec are classified as low-speed signals while signals having durations on the order of several $\mu$sec are classified as high-speed signals.

Also, in the device of the present embodiment, as the electronic controller output, the first electronic controller 100 is also made to generate, for example, low-speed digital outputs such as an ON/OFF command to an $O_2$ sensor heater, an ON/OFF command to a warning lamp and the like.

In other words, in the device of the present embodiment, the functions of the electronic control device are allotted in such a way that the first electronic controller 100 is mainly concerned with data input and output procedures while the second electronic controller 200 is mainly concerned with the execution of various computations based on such data.

The construction of the first and second electronic controllers 100, 200 are explained hereinafter.

First, the first electronic controller 100 which administers mainly data input/output-related processes is constructed as a single-chip microprocessor which includes a CPU 101 which is the central processing unit, a ROM (Read Only Memory) 102 that is used as the program memory, a RAM (Random Access Memory) 103 that is used as the data memory, a waveform shaping circuit 104, a timer I/O 105, an A/D converter 106, an input buffer 107, an output buffer 108, a communication arbitration circuit 109 and a serial communication circuit 110.

Here, the waveform shaping circuit 104 receives a high-speed digital input HDI such as engine rotation speed or the like, and shapes it into a binary shape; on the other hand, the timer I/O 105 clocks, for example, the onset edge period of such binary-shaped signal. Engine rotation speed at a particular instant is computed based on the clocked period time.

Meanwhile, the A/D converter 106 is a widely-known circuit which takes in an analog signal AI such as a knock signal, air flow volume, coolant temperature or the like, and converts it into a digital signal. Incidentally, among these analog signals, while the knock signal and air flow volume are classified as high-speed processing signals and while coolant temperature is a low-speed processing signal, the device of the present invention provides these signals to one A/D converter 106 irrespective of their type. It must be noted here that while some omissions have been made in FIG. 1 for purposes of simplicity, these analog signals are first provided to a selector such as an analog multiplexer or the like. Then, through the above-described CPU 101 or the communication arbitration circuit 109 to be described later, the signal which corresponds to the channel specified as the A/D conversion channel is chosen by the selector and is A/D converted by the A/D converter 106.

In addition, the input buffer 107 is a buffer circuit (memory) which temporarily stores a low-speed digital input which indicates the state of the A/C switch, the state of the neutral switch or the like while the output buffer 108 is a buffer circuit which temporarily stores a low-speed digital output such as an ON/OFF command to the $O_2$ sensor heater, an ON/OFF command to the warning lamp or the like.

Also, the communication arbitration circuit 109 and the serial communication circuit 110 arbitrate with the CPU 101 about the access to the RAM 103, the A/D converter 106, the input buffer 107 and the output buffer 108 so that these devices can also be accessed from the second electronic controller 200, and serially transmit the access demands from the second electronic controller 200 and the demanded data. The actual construction as well as the processing configuration are explained later with reference to FIGS. 2–5.

It must be noted here that in the first electronic controller 100, among the different components described above, the CPU 101, the ROM 102, the RAM 103, the timer I/O 105, the A/D converter 106, the input buffer 107, the output buffer 108 and the communication arbitration circuit 109 are connected to a common bus line 111 with the transfer of data between these devices being executed via this bus line 111.

On the other hand, the second electronic controller 200 is constructed to be a single-chip microprocessor which includes a CPU 201, a ROM 202 which serves as the program memory, a RAM 203, a timer I/O 205, a DMA (dynamic memory access) circuit 209 and a serial communication circuit 210.

It must be noted here that similar to the timer I/O 105 of the first electronic controller 100, the timer I/O 205 clocks, for example, the onset edge period of the signal that is binary-shaped by the waveform shaping circuit 104 of the first electronic controller 100. In this second electronic controller 200, the engine rotation speed at any particular instant is also computed based on the measured period time.

Also, in order for the second electronic controller 200 to be able to directly access the RAM 103, the A/D converter 106, the input buffer 107 and the output buffer 108 of the first electronic controller 100, the DMA circuit 209 and the serial communication circuit 210 cooperate with the above-described communication arbitration circuit 109 and serial communication circuit 110 of the first electronic controller 100 to serially communicate such access demands and the demanded resulting data. The construction and the process configuration of the DMA circuit 209 and the serial communication circuit 210 are also explained later with reference to FIGS. 2–5H.

It must be noted here that, also in this second electronic controller 200, among the above-described components, the CPU 201, the ROM 202, the RAM 203 and the timer I/O 205 are connected to a common bus line 211 with the data being transferred between these components via the bus line 211.

Next, details of a data input-output processing mechanism of the multi-CPU system according to the device of the present embodiment shall be explained while referring to FIGS. 2–5H.

Figure 2:
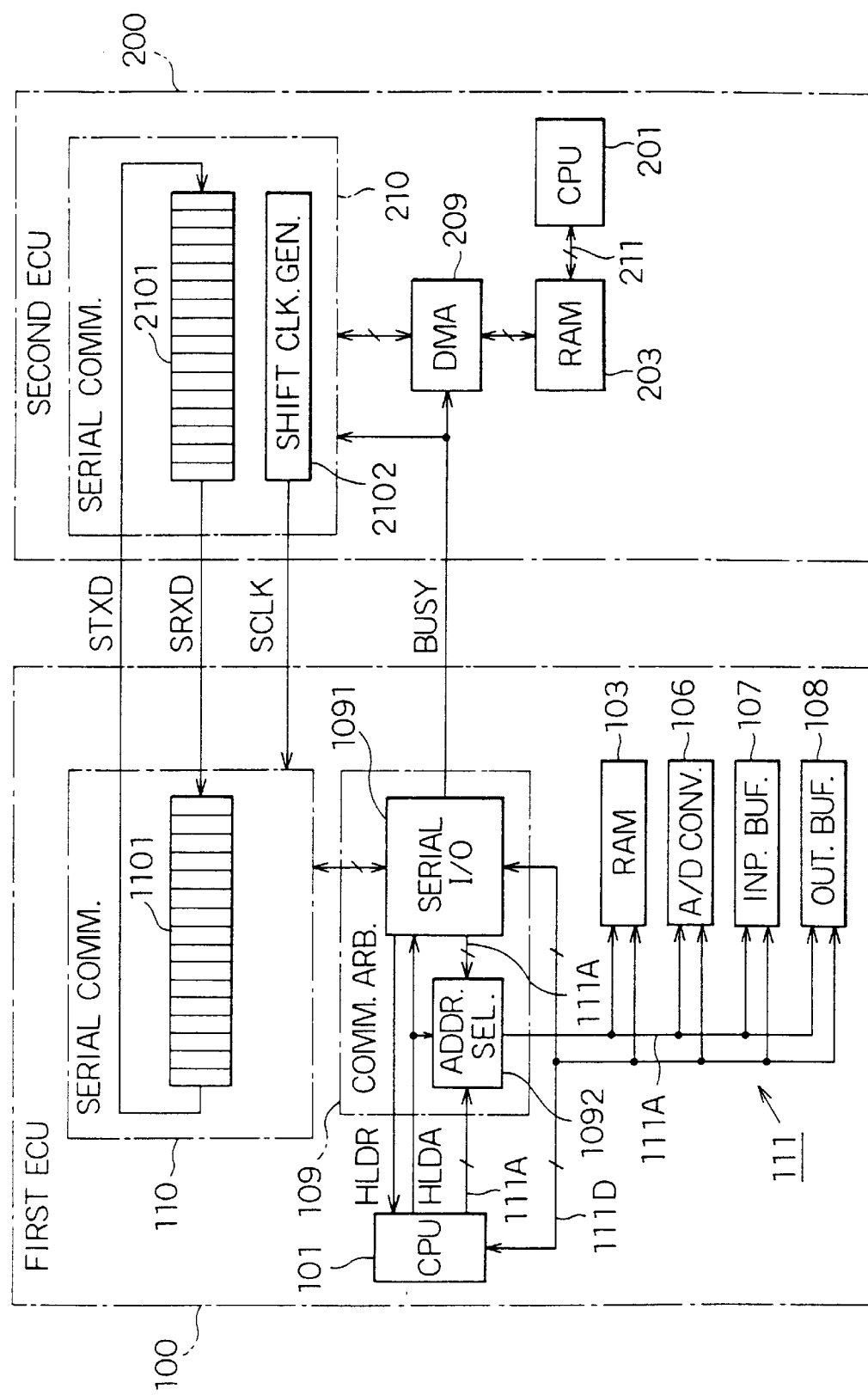
FIG. 2 is a block diagram showing in detail a communication arbitration circuit of the data input-output processor and surrounding circuits.
Figure 5:
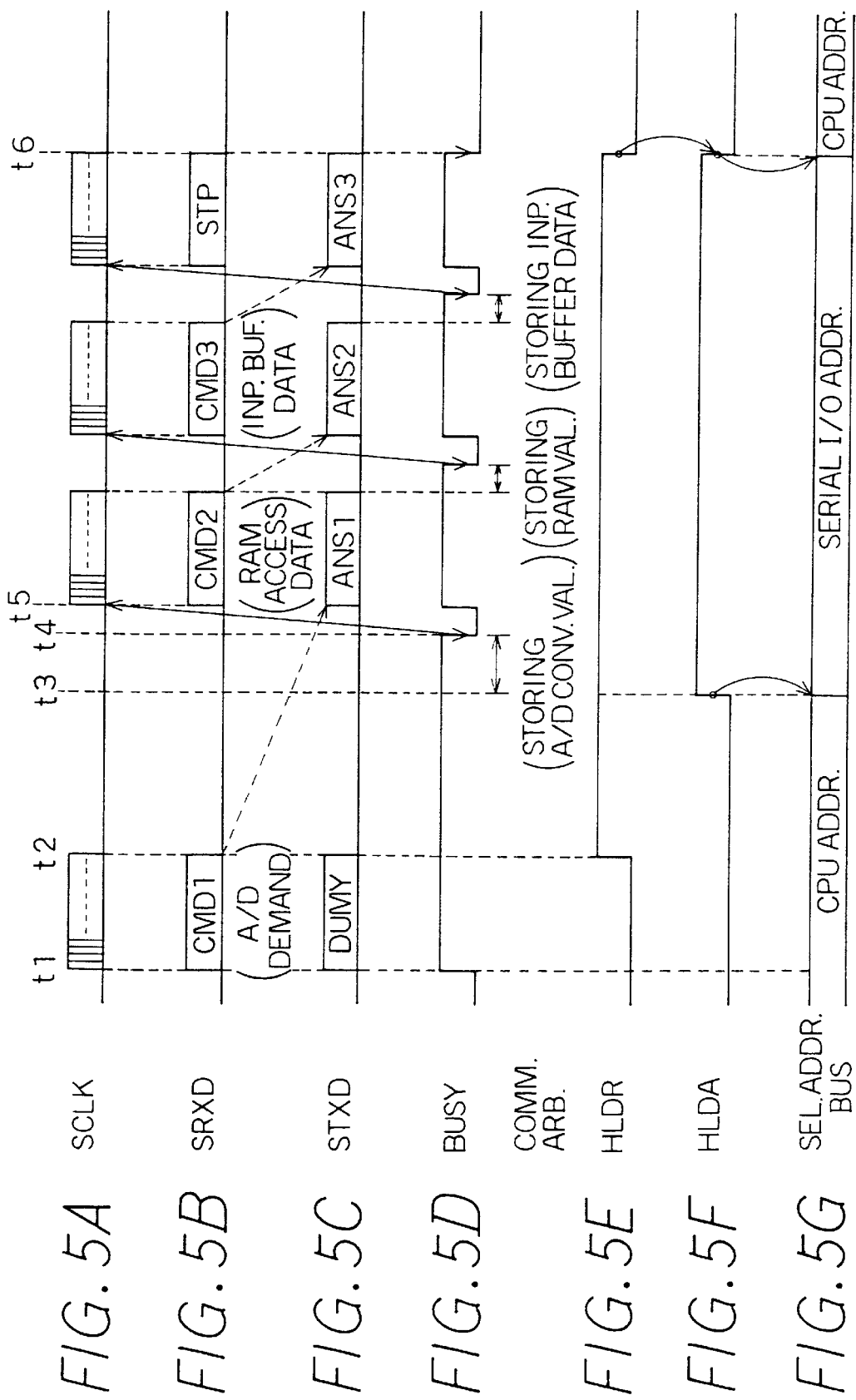
FIG. 5A–5G are graphs showing an example of a data input-output operation of the data input-output processor.

FIG. 2 shows an actual construction of the above-described communication arbitration circuit 109 and the serial communication circuits 110, 210. The same figure also shows the relationship of primarily this communication arbitration circuit 109 and these serial communication circuits 110, 210 with the CPU 101 and the CPU 202 when the above-described various input-output devices are being accessed.

First, the construction as well as the function of these circuits are explained with reference to FIG. 2.

As shown in FIG. 2, the serial communication circuits 110, 210 are formed to have 16-stage shift registers 1101, 2101, respectively.

The shift registers 1101, 2101 are connected to form a loop as shown in FIG. 2 with data being exchanged between them based on a shift clock SCLK generated by a shift clock generator 2102 of the serial communication circuit 210 side.

In other words, these shift registers 1101 and 2101, at each clock signal of the shift clock SCLK, execute a shift operation in which:

the front bit of the shift register 2101 is transmitted to the last bit of the shift register 1101;

the front bit of the shift register 1101 is transmitted to the last bit of the shift register 2101, and in the case of this example, all 16 bits of data set in each of the shift registers 1101, 2101 are exchanged when the shift clock SCLK generates 16 clock signals.

It must be noted here that the access demand to the various input-output devices (the RAM 103, the A/D converter 106, the input buffer 107, and the output buffer 108) generated by the CPU 201 and temporarily stored in the RAM 203 are directly set in the shift register 2101 via the DMA circuit 209. In the device of the present embodiment, hereinafter, as seen from the first electronic controller 100 side, the 16 bit-long data (access demand) set in the shift register 2101 which will be sent to the shift register 1101 is called a serial incoming message SRXD. An example of the data format of this serial incoming message SRXD is shown in FIG. 3.

As shown in FIG. 3, the uppermost three bits (b15, b14, b13) of this serial incoming message SRXD forms a demand command while the next five bits (b12, b11, b10, b09, b08) forms an address or A/D conversion channel information. The remaining lower 8 bits (b07–b00) are set with the data for storage when there is a demand to store in the RAM 103 and output buffer 108, and set with appropriate null and dummy data if there is no corresponding data for data access requests, A/D conversion requests and the like.

Moreover, through the communication arbitration circuit 109 which is explained below, the shift register 1101 is initially set with dummy data, and set with the corresponding reply data SRXD in accordance with the access demand inside the serial incoming message SRXD after the receipt of such a message. In this device of the present embodiment, as also seen from the first electronic controller 100 side, this 16-bit long data set in the shift register 1101 which will be sent to the shift register 2101 is hereinafter called serial outgoing data STXD. An example of the data format of this serial outgoing data STXD is shown in FIG. 4.

In other words, as shown in FIG. 4, the upper 8 bits (b15–b08) or 10 bits (b15–b06) of this serial outgoing data STXD form the reply data (access result data) that corresponds to the access demand while its 11th bit (b05) forms an identification bit for determining if the data in question is proper or not. In the device of the present embodiment, as the reply data, 10-bit long data is allotted only to the access result data which corresponds to the A/D conversion demand, i.e., the A/D converted value. On the other hand, 8-bit long data is allotted to the access data result which corresponds to the access demands to the RAM 103 or the input buffer 107. When replying with 8-bit long data, the remaining two bits are assigned with appropriate null or dummy data. Also, for verification purposes, the lower five bits (b04–b00) contain the address or the A/D channel conversion information specified in the corresponding serial incoming message SRXD. This is a copy of the five bits of data (b12–b08) of the same serial incoming message SRXD.

Meanwhile, as shown in FIG. 2, the communication arbitration circuit 109 is formed to have a serial I/O controller 1091 and an address selector 1092.

Here, the serial I/O controller 1091 which arbitrates between the serial communication circuit 110, the serial communication circuit 210 and the CPU 101 is a circuit which mainly executes the following operations:

(1) arbitration of the access operations with various input-output devices of the CPU 101 and that of the CPU 201 via the serial communication circuits 110, 210 so that these access operations do not overlap; and (2) deciphering the serial incoming message SRXD received in the shift register 1101, carrying out access operations with the various input-output devices (the RAM 103, the A/D converter 106, the input buffer 107 and the output buffer 108) in accordance with the demand command and setting the results in the same shift register 1101 as serial outgoing data STXD.

Operations (1) and (2) of the serial I/O controller 1091 are explained in more detail below.

First, the following processes are executed in the arbitration process of (1).

(1-1) When the serial incoming message SRXD is received in the shift register 1101 and after detecting such receipt, a hold (control) demand signal HLDR is generated to the CPU 101 (the logic level of the demand signal HLDR is set to an H level). It must be noted that at least for this time the various input-output devices are under the control of the CPU 101 and that the access operations of the CPU 101 to these various input-output devices are given priority.

(1-2) Hereinafter, the CPU 101 is monitored to see if it has generated the hold release signal HLDA (in other words, if the level of the release signal HLDA has been set to the H (high) level) or not. Incidentally, if the hold demand signal HLDR is generated to the CPU 101 when the same has finished access to the various input-output devices, the CPU 101 generates the hold release signal HLDA in response to the same demand. In addition, after generating this hold release signal HLDA, the CPU 101 refrains from performing access operations and remains waiting while the hold demand signal HLDR is being generated (the logic level is at the H level) even if it has a demand to again access the same input-output device.

(1-3) After the CPU 101 generates the hold release signal HLDA, control goes to the access execution procedure of (2).

(1-4) If an end command (STP of FIG. 3) which indicates the end of communication is received as the serial incoming message SRXD, the hold demand signal HLDR is reset (the logic level of this request signal HLDR is set to an L (low) level).

On the other hand, in more concrete terms, the access execution procedure of (2) involves the execution of the processes listed below.

(2-1) Dummy data DUMY is set beforehand in the shift register 1101.

(2-2) If the serial I/O controller 1091 is in the middle of processing operations such as when storing the serial outgoing data STXD in the shift register 1101 and the like, it generates a busy signal BUSY (the logic level of the busy signal BUSY is set to the H level) to the DMA circuit 209 and the serial communication circuit 210.

(2-3) The demand command of the serial incoming message SRXD received in the shift register 1101 is deciphered by the digital comparison of its code with the other codes, and the specified access address, storage address or the A/D conversion channel is accessed simultaneously in accordance with the deciphered command.

(2-4) If the deciphered command is a command demanding storage operations in the RAM 103, the output buffer 108 or the like, after storing the corresponding data, the dummy data DUMY is set in the shift register 1101. For all other cases, the data that was accessed or the A/D converted data is set in the shift register 1101 as serial outgoing data STXD.

With these functions of the serial I/O controller 1091, various input-output devices are efficiently shared between the CPU 101 and the CPU 201 by making the access operations of one CPU wait while the other CPU is executing access operations. In other words, with this sharing, the CPU 201 can directly access the various input-output devices without passing through the CPU 101 irrespective of whether the signal is a low-speed processing signal or a high-speed processing signal.

It must be noted here that the busy signal BUSY is being used as the communication timing signal in this device.

In other words, the DMA circuit 209 has a DMA function which operates based on an external edge input and by assigning the busy signal BUSY as the external edge input at every timing of the offset edge of the busy signal BUSY, the access demand to the various input-output devices stored in the RAM 203 by the CPU 201 is set in the shift register 2101 via the DAM circuit 209 and then sent to the shift register 1101. The busy signal BUSY is lowered to the L level every time the serial I/O controller 1091 finishes storing data in the shift register 1101.

Also, among bus lines 111, the address selector 1092 which forms the communication arbitration circuit 109 is a circuit which switches address and control bus line 111A to be:

(i) a bus line from the CPU 101 leading to the various input-output devices (the RAM 103, the A/D converter 106, the input buffer 107 and the output buffer 108); or (ii) a bus line from the serial I/O controller 1091 to the various input-output devices.

This switching of the address and control bus 111A is executed based on the hold release signal HLDA generated from the CPU 101 in which the bus line of (i) is selected when the signal HLDA is at the L level, and the bus line of (ii) is selected when the signal HLDA is at the H level. In other words, when the various input-output devices are under the control of the CPU 101, the bus line in the CPU 101 side is chosen while the bus line in the serial I/O controller 1091 (CPU 201) side is chosen when the such input-output devices are under the control of the serial I/O controller 1091.

Switching the bus lines via the address selector 1092 enables the sharing of the address and control bus 111A between the CPU 101 and the communication arbitration circuit 109 and thus the space needed for its installment can be reduced. It must be noted here that among the bus lines of the bus line 111, a data bus 111D can be shared as is.

FIGS. 5A–5H show one operation of the device of the present embodiment. Next, the data input-output processing operation of the device of the present embodiment is explained in more detail with reference to these Figures.

It must be noted that FIGS. 5A–5C show the states of the serial transmission circuits 110, 210 with FIG. 5A showing the generation of the shift clock SCLK, FIG. 5B showing the transmission of the serial incoming message SRXD and FIG. 5C showing the transmission of the serial outgoing message STXD. Meanwhile, FIG. 5D shows the generation of the busy signal BUSY generated from the communication arbitration circuit 109 while the space between FIGS. 5D and 5E shows an example of a process of the communication arbitration circuit 109. FIGS. 5F–5G show the relationship between the communication arbitration circuit 109 and the CPU 101 where FIGS. 5F–G show the logic levels of the hold demand signal HLDR and the hold release signal HLDA, and FIG. 5H shows the selection of the address and control bus 111A by the address selector 1092.

Meanwhile, at time t1, when the A/D conversion demand (CMD1) stored in the RAM 203 by the CPU 201 is set in the shift register 2101 via the DMA circuit 209, a shift clock SCLK is generated from the shift clock generator as shown in FIG. 5A, and serial communication (data exchange) starts between the serial communication circuits 110, 210. It must be noted here that, as explained in the above, the serial I/O controller 1091 sets dummy data DUMY beforehand in the shift register 1101 as shown in FIG. 5C before communication starts and that the serial I/O controller 1091 generates the busy signal BUSY to the DMA circuit 209 and the serial communication circuit 210 at the start of the communication.

When such communication (data exchange) is completed at time t2, the serial I/O controller 1091 reads the message SRXD received in the shift register 1101. Then, at the same time t2, the serial I/O controller 1091 which detects that there is an access demand from the CPU 201 sends, as shown in FIG. 5F, the hold demand signal HLDR to the CPU 101. However, at this point, the CPU 101 is still accessing the various input-output devices and thus, such demand is not immediately granted and the serial I/O controller 1091 continues to wait until the finish of such an access operation.

Thereafter, at time t3, the access operations of the CPU 101 end, and, as shown in FIG. 5G, when the hold release signal HLDA is generated from the CPU 101, the address selector 1092 switches the address and control bus 111A as shown in FIG. 5H. At the same time, the serial I/O controller 1091 begins its access operations to the A/D converter 106 based on the deciphered serial incoming message SRXD. It must be noted that, as explained before, the A/D conversion channel written in the incoming message SRXD is designated in this access operation. In addition, when the A/D converted value is derived, the serial I/O controller 1091 stores it to the shift register 1101 as the serial outgoing data STXD (ANS1) which is shown in FIG. 4.

At time t4, when this storage operation finishes, the busy signal BUSY being generated from the serial I/O controller 1091 is reset for the moment (the busy signal BUSY is at the L level) as shown in FIG. 5D. During this time, as explained before, the DMA circuit 209 sets the next access demand of the CPU 201 (which is the RAM value access demand (CMD2)) in the shift register 2101 during the offset edge of the busy signal BUSY.

By setting the access demand, at time t5, the shift clock generator 2102 again generates the shift clock SCLK which is shown in FIG. 5A, and data exchange between the serial communication circuits 110, 210 is resumed. As shown in FIGS. 5B–5C, the RAM value access demand (CMD2) and the A/D converted value (ANS1) which is the access result are exchanged during this data exchange.

Hereinafter, the serial I/O controller 1091 performs the following processes:

(1) raising the busy signal BUSY to the H level;
(2) deciphering the RAM value access demand (CMD2), accessing the specified address in the RAM 103 and storing (setting) the accessed RAM value in the shift register as the serial outgoing data STXD (ANS2); and
(3) lowering the busy signal BUSY to the L level at the end of the storage process.

On the other hand, the DMA circuit 209 executes the following:

(1) storing the A/D converted value (ANS1) which is the access result in the RAM 203; and (2) setting the input buffer data access (CMD3), which is the third access demand stored in the RAM 103, in the shift register 2101 based on the offset timing of the busy signal BUSY to the L level. It must be noted here that also for this input buffer data command (CMD3) which is the new access demand, processes based on the processes performed by the serial I/O controller 1091 and the DMA circuit 209 shall be executed after exchanging this command with the RAM value (ANS2), which is the access result, via the serial communication circuits 110, 210.

Then, towards the end, the stop command (STP) is received in the shift register 1101 as the demand command and when the serial I/O controller 1091 deciphers this at time t6, as shown in FIG. 5F, the serial I/O controller 1091 resets the hold demand signal HLDR (lowered to the L level) being generated to the CPU 101, and with the resetting of the hold demand signal HLDR, as shown in FIG. 5G, the CPU 101 resets the hold release signal HLDA. Also, by resetting the hold release signal HLDA, as shown in FIG. 5H, the address selector 1092 switches the address and control bus and so, the various control devices are again under the control of the CPU 101. On the other hand, the serial I/O communication controller 1091 remains waiting until the serial communication circuit 110 again receives an access demand.

As shown above, according to the data input-output processor of the present embodiment, because the access to the various input-output devices are arbitrated properly via the communication arbitration circuit 109, irrespective of whether it is the CPU 101 or the CPU 201 that is executing the access operation, direct access to the various input-output devices can be performed basically at any time.

In other words, in a multi-CPU system where access demands to the input-output devices are made asynchronously, the limited input-output devices can be shared efficiently, and thus, the reduction of the number of components and the reduction in the board size of the multi-CPU system can be suitably designed.

Moreover, according to the device of the present embodiment, with regards to the CPU 201's use of the various input-output devices, because the communication arbitration circuit 109 performs all the access operations on behalf of the CPU 201, there is no increase in the processing load of the CPU 101.

Figure 6:
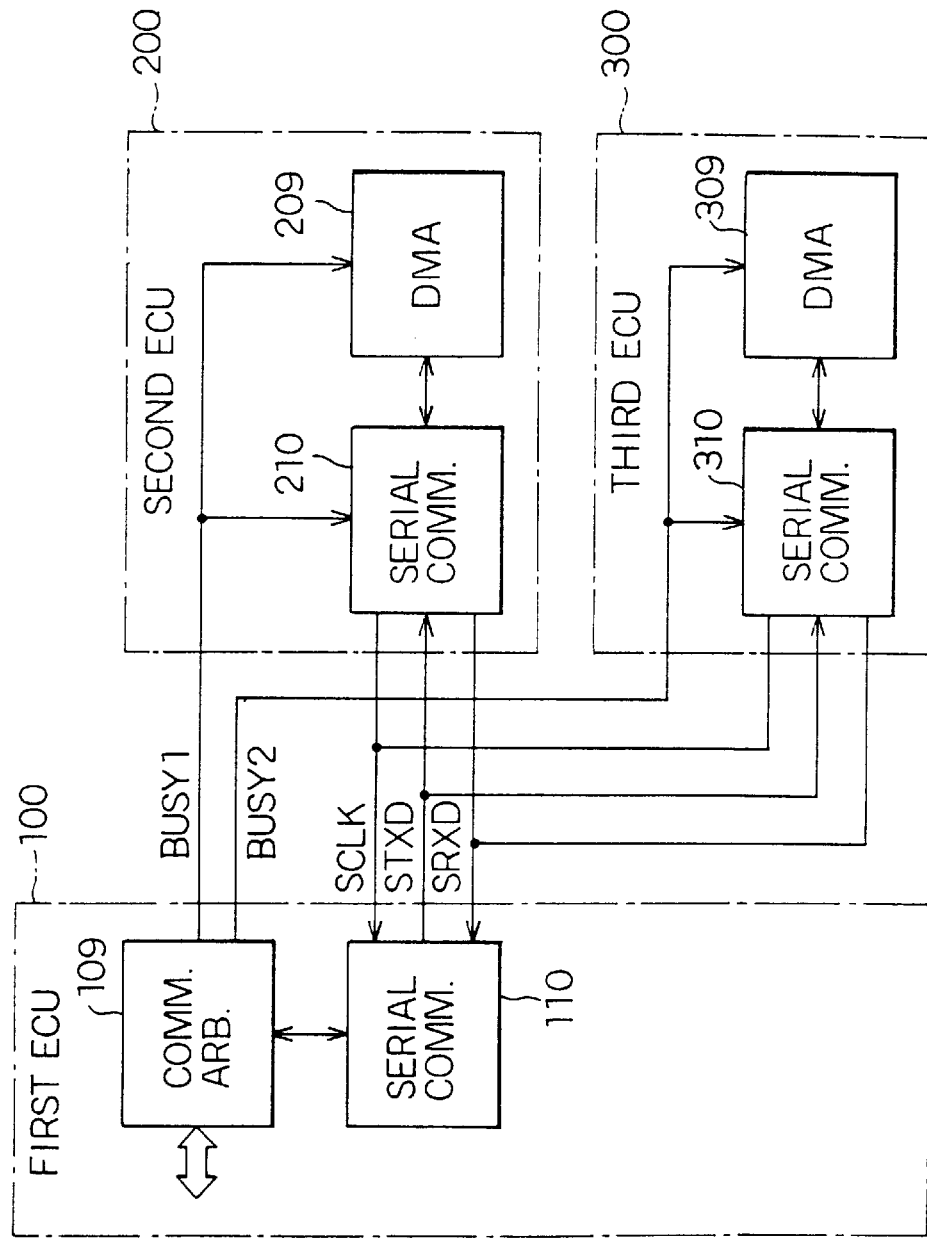
FIG. 6 is a block diagram of an example of a system expansion of the data input-output processor.
Figure 7:
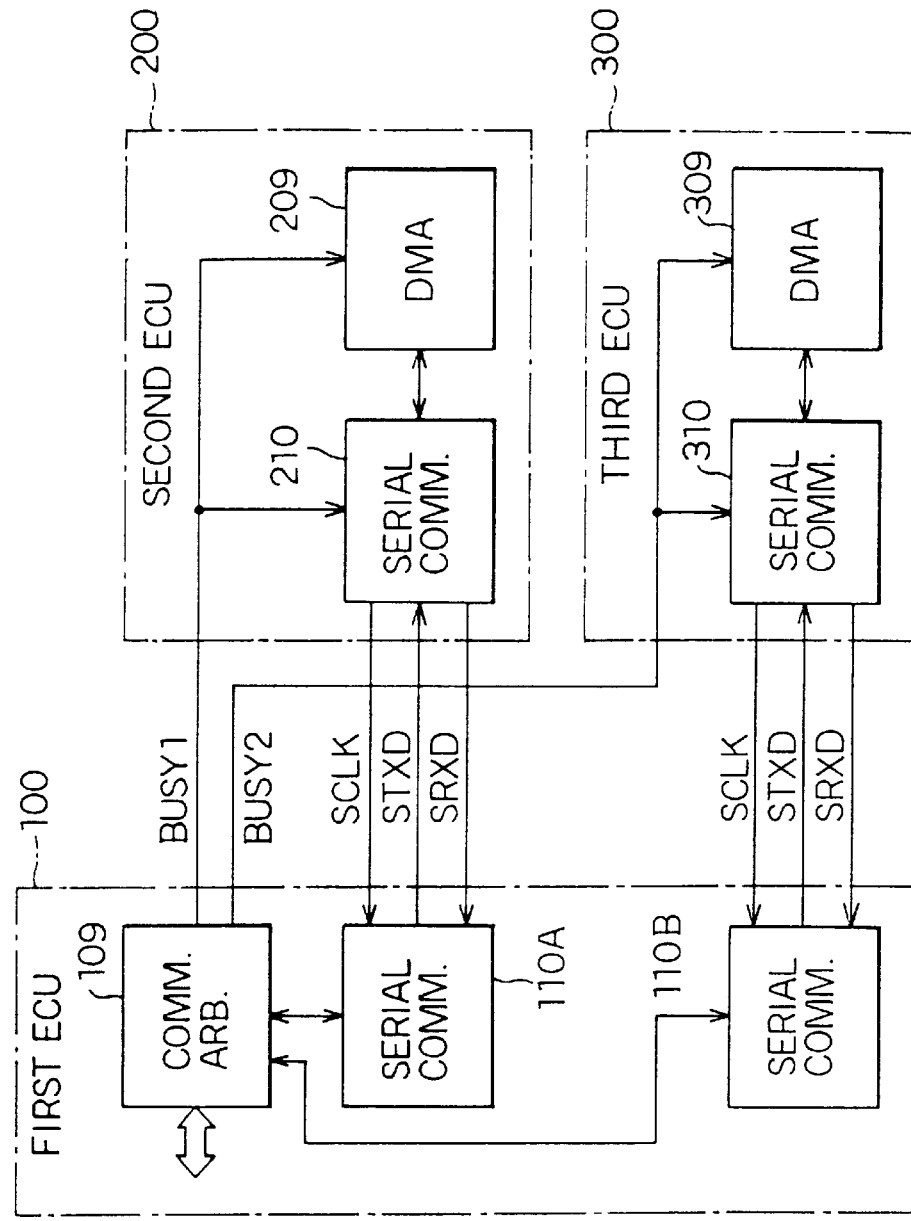
FIG. 7 is a block diagram of another example of a system expansion of the data input-output processor.

While the case wherein engine control-related processes have been distributed between two electronic controllers which are the first electronic controller 100 and the second electronic controller 200 has been discussed in this device of the present embodiment, it must be noted here that, for example, by expanding the communication processing system as shown in FIGS. 6–8, as a multi-CPU system, such functions can be distributed between a greater number of electronic controllers.

The sample constructions shown in FIGS. 6–8 are explained briefly hereinafter.

First, in the system shown in FIG. 6, a communication arbitration circuit 109' whose construction is based on the communication arbitration circuit 109 executes access demands to the various input-output devices (omitted from FIG. 6) on behalf of two electronic controllers which are the electronic controller 200 and the electronic controller 300.

In other words, the communication arbitration circuit 109' allows and restricts serial communication (data exchange) with a second electronic controller 200 and a third electronic controller 300 by using separate signals BUSY1 and BUSY2 to these electronic controllers. It must be noted that for this case the identification of the second electronic controller 200 and the third electronic controller 300 can be done by, for example:

attaching the ID (identification) codes of the second electronic controller 200 or the third electronic controller 300 to the serial incoming message SRXD;

installing separate signal lines between the communication arbitration circuit 109' and the second electronic controller 200 and the third electronic controller 300 so that these electronic controllers can send separate communication demand signals to the communication arbitration circuit 109'.

Whatever the case may be, the communication arbitration circuit 109' arranges the output of the busy signals BUSY1 and BUSY2 in accordance with such identification. It must be noted here that the system shown in FIG. 6 is the system which attaches identification codes.

By employing this kind of system, the first, second and third electronic controllers 100, 200, 300 can efficiently share the limited input-output devices.

Furthermore, the system shown in FIG. 7 is one in which the same communication arbitration circuit 109' accesses the various input-output devices (which are omitted from this Figure) on behalf of the second electronic controller 200 and the third electronic controller 300.

However, here, the first electronic controller 100 is provided with separate serial communication circuits 110A, 110B which correspond to the two electronic controllers 200, 300 and data exchange is executed separately, i.e., either between the serial communication circuit 110A and the serial communication circuit 210 or the serial communication circuit 110B and the serial communication circuit 310.

Also with this construction, in the same way as that of the system shown in FIG. 6, the limited input-output devices can be shared among the first, second and third electronic controllers 100, 200, 300 (i.e., among CPUs not shown which are mounted in these electronic controllers).

It must be noted here that the present system is similar to the system shown in FIG. 6 in that the second electronic controller 200 and the third electronic controller 300 can be properly distinguished from each other and that the communication arbitration circuit 109' arranges the output of the busy signals BUSY1 and BUSY2 based on such identification.

On the other hand, in the system shown in FIG. 8, the first, second and third electronic controllers 100, 200, 300 are connected in series, with the second electronic controller 200 relaying the access demands of the third electronic controller 300 to the various input-output devices (not shown) installed inside the first electronic controller 100 and the access results to the third electronic controller 300.

In other words, in this case, a DMA circuit 209' of the second electronic controller 200 is formed as a circuit having the following functions:

raising a busy signal BUSY' to the DMA circuit 309 of the third electronic controller 300 to the H level and performing functions which are the same as those of the DMA circuit 209 when the second electronic controller 200 itself is generating access demands; and making the serial communication circuit 210 function as a communication relay circuit between the serial communication circuit 310 of the third electronic controller 300 and the serial communication circuit 110 of the first electronic controller 100, and relaying the busy signal BUSY generated from the communication arbitration circuit 109 as is as the busy signal BUSY' to the DMA circuit 309 of the third electronic controller 300 when there is no access demand from the second electronic controller 200 and there is an access demand in the third electronic controller 300 side.

Also with this type of construction, in the same way as that of the systems shown in FIGS. 6–7, the limited input-output devices can be shared among the first, second and third electronic controllers 100, 200, 300 (i.e., among CPUs not shown which are mounted in these electronic controllers).

Moreover, according to this system shown in FIG. 8, the first and second electronic controllers 100, 200 employed in the device of the present embodiment as well as the data format can be used for the first electronic controller 100 and the third electronic controller 300 here. In other words, there is no need for the communication arbitration circuit 109 to distinguish between the access demand from the second electronic controller 200 and the access demand from the third electronic controller 300.

Meanwhile, in all of the systems described above as well as the device of the present embodiment, handshake communication using serial data has been used as the data communication (data exchange) method. Accordingly, high-speed data communication can be achieved with fewer lines (communication lines). However, there is no need to be restricted to the use of only this system. Other methods, for example, may be appropriately used such as using a serial communication circuit which employs a full duplex communication interface that receives data all at once and then sends back outgoing data.

Also, in the present embodiment, while the bus line is constructed to be shared by the CPU 101 and the communication arbitration circuit 109 (serial I/O controller 1091), if there are ample spaces in the board area, separate bus lines can be provided for these devices. In this case, the communication arbitration circuit 109 can be formed without providing the address selector 1092.

Also, while the vehicle-mounted engine electronic controller has been cited as an example of the multi-CPU system, it goes without saying that the data input-output processor of the present invention is not limited to this engine control system. In other words, the data input-output processor of the present invention can be applied to any other system where a plurality of CPUs asynchronously share the input-output devices and execute the distributed processes.

As explained before, the resolution of the A/D converter itself must be enhanced if a high-precision digital signal is to be derived from the input analog signal. In other words, the cost of one A/D converter becomes very expensive. In this light, the construction of the data input-output device of the present embodiment becomes more significant when the A/D converter is shared among the plurality of CPUs.

Although the present invention has been fully described in connection with preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. A data input-output processor for a multi-CPU system which executes data input-output and computation-related processes by distributing functions among a plurality of CPUs, said data input-output processor comprising:

data input-output means, connected by a bus to a first CPU, for executing data input-output operations;

communication means, between a second CPU that is distinct from said first CPU and said data input-output means, for receiving access data of said second CPU and for transmitting said access data to said data input-output means; and communication arbitration means, between said communication means and said first CPU, for arbitrating access operations of said first CPU and said second CPU to said data input-output means so that said access operations do not overlap, said communication arbitration means including bus switching means for selectively connecting said bus to said first CPU and to said communication arbitration means;

wherein when said first CPU is not accessing said data input-output means, said communication arbitration means executes access operations to said data input-output means on behalf of said second CPU in accordance with a demand received by said communication means from said second CPU.

2. A data input-output processor for a multi-CPU system according to claim 1, wherein when said first CPU is not accessing said data input-output means, said communication arbitration means sends results of said access operations to said second CPU via said communication means.

3. A data input-output processor for a multi-CPU system according to claim 1, wherein said data input-output means is selected from the group consisting of:

an input buffer for temporarily storing an input signal;

A/D conversion means for converting an analog input signal to a digital signal;

a RAM for storing computation data computed by at least any one of said first CPU and said second CPU based on said digital signal; and an output buffer for temporarily storing an output signal generated based on said computation data.

4. A data input-output processor for a multi-CPU system according to claim 3 wherein when said first CPU is not accessing said data input-output means, said communication arbitration means accesses said data input-output means on behalf of said second CPU in accordance with a demand of said second CPU received by said communication means.

5. A data input-output processor for a multi-CPU system according to claim 1, wherein said communication means transmits and receives said data via serial data-based handshake communication operations.

6. A data input-output processor for a multi-CPU system according to claim 1 wherein said communication means synchronously sends said access data from said second CPU to said data input-output means and data, which is based on said access data, from said data input-output means to said second CPU.

7. A data input-output processor for a multi-CPU system which executes data input-output and computation-related processes by distributing functions among a plurality of CPUs, said data input-output processor comprising:

A/D conversion means, connected by a bus to a first CPU, for converting an analog input signal to a digital signal;

communication means, between a second CPU that is distinct from said first CPU and said A/D conversion means, for receiving an A/D conversion demand from said second CPU and converted data from said A/D conversion means and transmitting said converted data to said second CPU; and communication arbitration means, between said communication means and said first CPU, for arbitrating A/D conversion demands of said first CPU and said second CPU to said A/D conversion means so that said conversion demands do not overlap, said communication arbitration means including a bus switching means for selectively connecting said bus tosaid first CPU and to said communication arbitration means;

wherein when said first CPU is not accessing said A/D conversion means, said communication arbitration means executes access operations to said A/D conversion means on behalf of said second CPU in accordance with the A/D conversion demand received by said communication means, from said second CPU and sends converted data to said second CPU via said communication means.

8. A data input-output processor for a multi-CPU system according to claim 7, wherein said communication means transmits and receives said A/D conversion demand and said converted data via serial data-based handshake communication operations.

9. A data input-output processor for a multi-CPU system which executes data input-output and computation-related processes by distributing functions among a plurality of CPUs, said data input-output processor comprising:

data input-output means, connected by a bus to a first CPU, for executing data input-output operations;

communication means, between a second CPU that is distinct from said first CPU and said data input-output means, for receiving access data of said second CPU and for transmitting said access data to said data input-output means; and communication arbitration means, between said communication means and said first CPU, for arbitrating access operations of said first CPU and said second CPU to said data input-output means so that said access operations do not overlap;

wherein said multi-CPU system includes second communication means, between a third CPU, which is distinct from said first CPU and said second CPU, and said data input-output means, and is connected in parallel to said communication means, wherein:

said communication means sends access data, which includes identification information of said second CPU, from said second CPU to said data input-output means;

said second communication means sends access data, which includes identification information of said third CPU, from said third CPU to said data input-output means; and said communication arbitration means is between said communication means, said second communication means and said first CPU to arbitrate access operations of said first CPU, said second CPU and said third CPU to said data input-output means based on said identification information so that said access operations do not overlap.

10. A data input-output processor for a multi-CPU system which executes data input-output and computation-related processes by distributing functions among a plurality of CPUs, said data input-output processor comprising:

data input-output means, connected by a bus to a first CPU, for executing data input-output operations;

communication means, between a second CPU that is distinct from said first CPU and said data input-output means, for receiving access data of said second CPU and for transmitting said access data to said data input-output means; and communication arbitration means, between said communication means and said first CPU, for arbitrating access operations of said first CPU and said second CPU to said data input-output means so that said access operations do not overlap;

wherein said multi-CPU system includes third communication means connected in series between a third CPU, which is distinct from said first CPU and said second CPU, and said communication means, wherein:

said communication means sends and receives said access data, which includes identification information of said second CPU, to said data input-output means from said second CPU;

said third communication means relays access data, which includes identification information of said third CPU, from said third CPU to said data input-output means and performs transceiving operations between said communication means and said third CPU; and said communication arbitration means is between said communication means and said first CPU to arbitrate access operations of said first CPU, said second CPU and said third CPU to said data input-output means based on said access information so that said access operations do not overlap.

* * * * *